C. S. BARON.
SANITARY PITCHER OR THE LIKE.
APPLICATION FILED APR. 16, 1917.
1,389,732.
Patented Sept. 6, 1921.
2 SHEETS—SHEET 1.
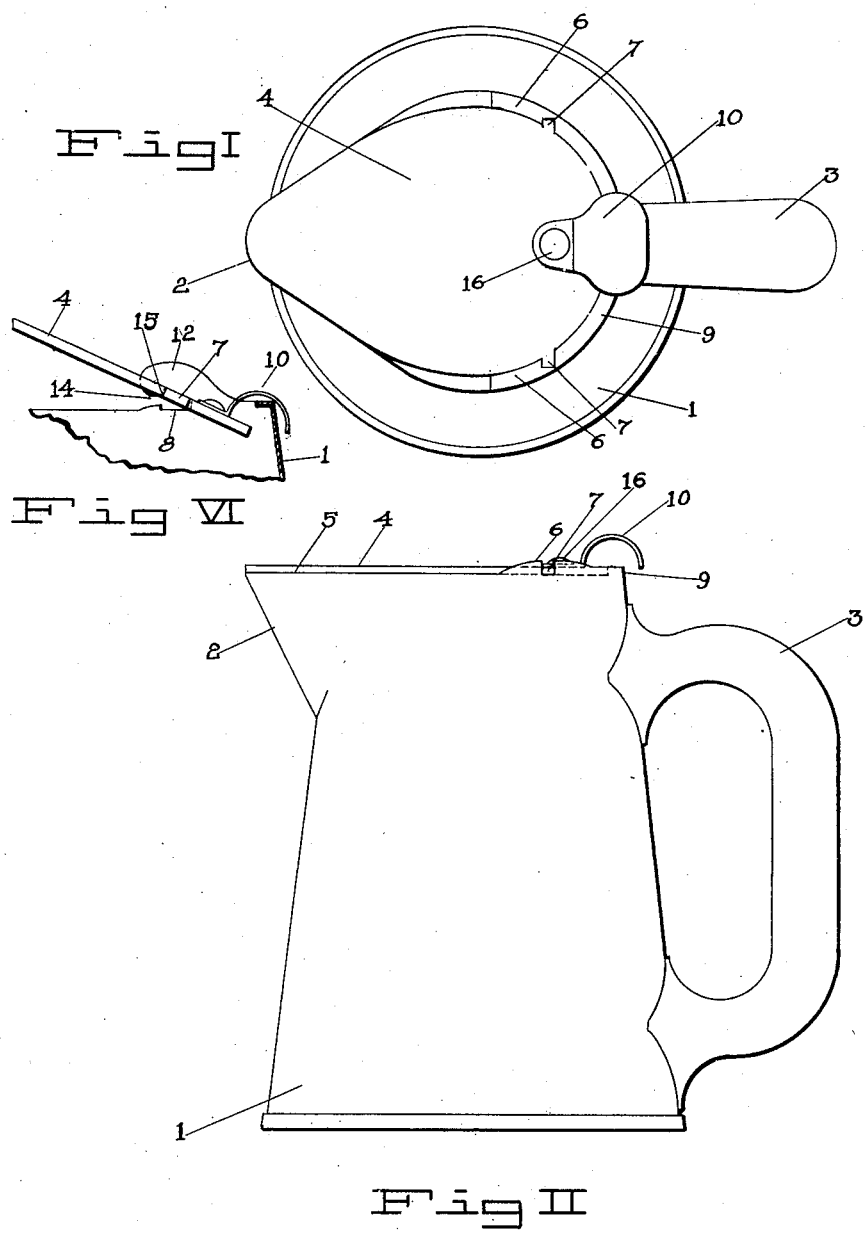

C. S. BARON.
SANITARY PITCHER OR THE LIKE.
APPLICATION FILED APR. 16, 1917.
1,389,732.
Patented Sept. 6, 1921.
2 SHEETS—SHEET 2.
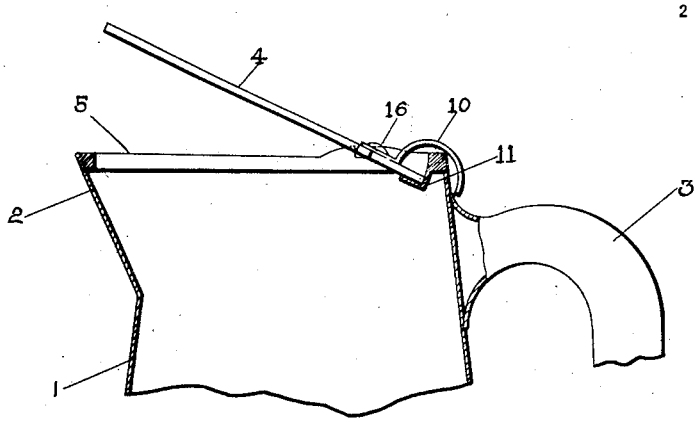
Fig. III
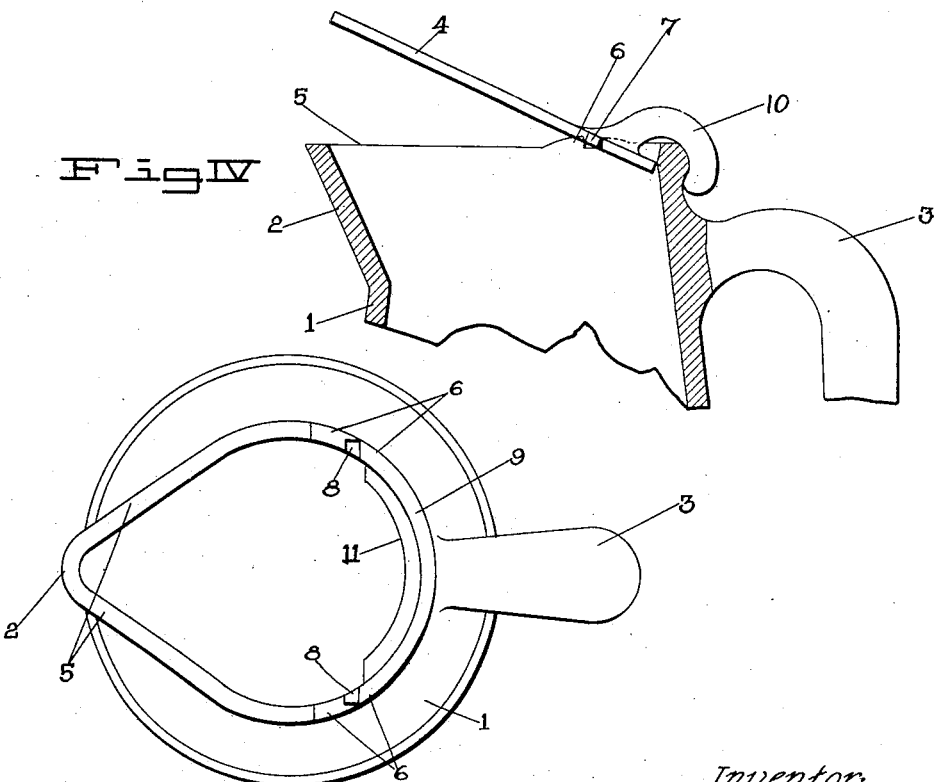
Fig. IV
Fig. V
Inventor:
Charles S. Baron,
By
Joseph F. Atkins,
Attorney.

UNITED STATES PATENT OFFICE.

CHARLES S. BARON, OF TIFFIN, OHIO.

SANITARY PITCHER OR THE LIKE.

1,389,732.          Specification of Letters Patent.          Patented Sept. 6, 1921.

Application filed April 16, 1917. Serial No. 162,344.

*To all whom it may concern:*

Be it known that I, CHARLES S. BARON, a citizen of the United States of America, residing at Tiffin, in the county of Seneca, in the State of Ohio, have invented certain new and useful Improvements in Sanitary Pitchers or the like, of which the following is a specification, reference being had to the accompanying drawings.

My invention relates to pitchers, jugs or containers for liquids and consists of certain improvements upon the subject matter of U. S. Letters Patent, No. 1,173,546, issued to me under date of February 29, 1916, said improvements being such as are hereinafter specified in detail and succinctly set forth in the appended claims.

In the accompanying drawings,

Figure I is a top plan view of an example of a metal container showing my invention in one form of embodiment.

Fig. II is a side elevation of the same.

Fig. III is a vertical central section partially in elevation of the subject matter of Fig. II, showing the lid elevated.

Fig. IV is a view similar to Fig. III, but showing a container and lid both made of glass or fictile material.

Fig. V is a view of the matter of Fig. IV taken as in Fig. I but showing the lid removed.

Fig. VI illustrates, in a fragmentary view similar to Fig. III, modification of means for detachably securing the lid to the container.

Referring to the numerals on the drawings, 1 indicates the body of a container of any suitable shape and dimensions, and made of any preferred material. It may be made, for example, of metal, glass or fictile material, and is preferably provided, on one side, with a spout 2, and, on the opposite side, with a handle 3.

On top of the body 1, I provide a lid 4. The lid may also be made of preferred material, the representations shown in Figs. I, II, and III being those of a metallic lid.

It is to the lid as well as to its means of attachment to the container that my present invention particularly relates.

In my patent, above described, the specific form of lid shown therein is one which is countersunk into the open end of the container, and in respect to which special provision is made for securing it to the container when the lid is opened and the container tilted for the discharge of its contents.

I have found it advantageous, in point of economy and for other reasons, to provide a lid which, when closed, will lie flat across the flush edge 5 of the open discharge end of the container. This construction is provided for by the presence of bearing ears 6 projecting beyond the plane of the edge 5, the ears 6 being provided upon opposite sides of the open end of the container for the accommodation of oppositely projecting trunnions 7 upon the lid. The trunnions 7 are accommodated by recesses 8, one of which characterizes each bearing ear 6, as shown in Fig. V. The two members 6 are preferably connected by an elongation of the rear wall 9, preferably made integral with the bearing ears and the body of the container, the height of the elongation 9 being in practice substantially equal to the thickness of the lid 4, as clearly shown, for example, in Fig. II. The effect is to afford a proper closure of the container at all points of the periphery of the lid, the back of the lid closing shearwise against the elongation 9 by its proximity to the inside of the elongation, and the fore part of the lid closing against the edge 5 of the container.

The lid 4 is, otherwise than herein specified, substantially identical with that described in my previous patent, and is provided like it, with a projection by which the lid may be opened by pressure upon it of the thumb of a hand grasping the handle 3. The projection is, however, according to my present invention, made in the form of an inwardly curving thumb piece 10 which extends rearwardly a sufficient distance to engage the wall of the container adjacent to the handle 3, when the lid is open, as clearly shown, for example, in Fig. III.

The thumb piece 10 serves the double purpose of a stop to the tilting motion of the lid, and of a confining member to insure the continuance of the pivotal relationship between the lid and the container when the lid is open.

By reason of its action as a stop member, the presence of the thumb piece 10 renders that of the depressed portion 11, corresponding to that indicated by the numeral 8 in my patent aforesaid, not indispensable. In Figs. I, III and V it is shown as present and in Figs. IV and VI as omitted.

The thumb piece 10, in its function of preserving the pivotal relationship between the lid and the container, may be supplemented or supplanted, as preferred, by positive means of engaging the trunnions 7, such, for example, as shown in Fig. VI. In the form of embodiment shown in that figure, the construction previously described may be adhered to with the addition only of overhanging engaging members 12, one for each trunnion. A passage way 14 between the free end of each member 12 and the ear 6 thereunto adjacent may be provided for the introduction of a trunnion 7, which, when introduced, finds room for its desired oscillation provided between the recess 8 in the bearing ear 6 and an opposing recess 15 in the member 12.

If the thumb piece 10 and its lid 4 be made of metal, they may be conveniently united as by a rivet 16. It is, however, entirely practicable to make the thumb piece and the lid integral, one with the other, as shown, for example, in Figs. IV and VI. This construction is preferable in the manufacture of a lid and thumb piece of glass or fictile material.

The operation of my device, corresponding substantially to that described in my aforesaid patent, has, it is believed already been amply described in the foregoing specification.

What I claim is:

The combination with a receptacle provided upon opposite sides of its open end with bearings, and an upward elongation of the rear wall of the receptacle between said bearings, of a removable tilting lid provided with members for removably engaging said bearings and completely closing the open end of the receptacle by resting upon the forward edge of the open end and by an edgewise engagement of the lid with the elongated rear wall between said bearings, said lid having an upwardly and downwardly curved thumb piece projecting over the elongated edge of the receptacle thereby serving as a means both for actuating and limiting the tilting movement of the lid.

In testimony whereof I have hereunto set my hand in the presence of two subscribing witnesses.

CHARLES S. BARON.

Witnesses:
 HELEN SWING,
 HARRY TAGGART.